United States Patent [19]

Bishop et al.

[11] 3,916,399

[45] Oct. 28, 1975

[54] RECTIFIER MONITORING CIRCUIT

[75] Inventors: John Daniel Bishop, Morris Township, Morris County; Francis Kunzinger, Parsippany; Weyman Blanchard Suiter, Jr., Whippany, all of N.J.

[73] Assignee: Bell Telephone Laboratories, Incorporated, Murray Hill, N.J.

[22] Filed: Sept. 9, 1974

[21] Appl. No.: 504,082

[52] U.S. Cl. ...... 340/248 A; 307/235 R; 340/248 E
[51] Int. Cl.² ......................................... G08B 21/00
[58] Field of Search......... 340/248, 253; 307/235 R, 307/219; 328/135, 146, 148

[56] References Cited
UNITED STATES PATENTS

| | | | |
|---|---|---|---|
| 3,132,332 | 5/1964 | Breslow | 340/248 A |
| 3,184,729 | 5/1965 | Freedman et al. | 340/248 A |
| 3,641,546 | 2/1972 | Blackburn | 340/248 A |
| 3,745,548 | 7/1973 | Skelton et al. | 340/253 E |
| 3,755,801 | 8/1973 | Milo | 340/248 A X |
| 3,786,465 | 1/1974 | Woods | 340/248 A |
| 3,789,242 | 1/1974 | Cantor | 307/235 R |

*Primary Examiner*—John W. Caldwell
*Assistant Examiner*—Daniel Myer
*Attorney, Agent, or Firm*—J. S. Cubert

[57] ABSTRACT

Each of a plurality of parallel power supplies is connected to a common load via a coupling diode. The voltage across the coupling diode is monitored as well as the peak conducting voltage across the supply rectifier devices. A comparator is responsive to the monitored coupling diode voltage exceeding the monitored rectifier device conducting voltage to produce an alarm signal indicative of the supply not being coupled to the common load through the coupling diode.

14 Claims, 4 Drawing Figures

RECTIFIER MONITORING CIRCUIT

BACKGROUND OF THE INVENTION

Our invention relates to power supply systems, more particularly to the parallel connection of power sources to serve a common load, and more particularly to monitoring arrangements for detecting faulty operation of said paralleled power sources.

In the operation of electronic systems, it is often necessary to supply large currents to a load at a particular voltage. It is sometimes advantageous to employ a plurality of standard design power sources to drive the common load rather than a larger nonstandard power source. Each paralleled power source comprises a rectifier unit and the rectifier unit may be connected to the common load through a coupling diode. Advantageously, the paralleled power source arrangement may provide improved reliability through the use of redundant power sources. For proper service of the load from the paralleled sources, it is required that each source drive its assigned share of load current. In the event the source coupling diode is defective, the remaining paralleled power sources must drive the load and overloading of said remaining power sources is possible. Where the power source coupling diode exhibits a high forward characteristic or is open, its power source is effectively disconnected from the common load and the other paralleled sources are more heavily loaded. It is therefore desirable to monitor the condition of the coupling diodes so that an alarm can be set responsive to the occurrence of such a difficulty with the coupling diode.

Several monitoring arrangements known in the art utilize a device to measure the voltage across the coupling diode. An alarm is set in the event the measured diode voltage falls outside an acceptable range. If each power source includes a voltage regulator, however, the voltage at the source connection to the coupling diode does not change appreciably when the coupling diode conducts little or no current. The voltage at the load connection to the coupling diode does not change significantly either, since the other paralleled power sources still maintain the load voltage at its regulated value. Thus, where there is an open or high forward characteristic coupling diode, the voltage thereacross does not fall outside the acceptable range and the faulty condition is not detected.

It is an object of the invention to provide an improved monitoring circuit in a power source arrangement adapted to drive a load device.

It is another object of the invention to provide an improved monitoring circuit to detect a poorly coupled power source in a group of paralleled power sources serving a common load.

It is yet another object of the invention to provide an improved monitoring circuit which detects the existence of a defective coupling diode connected between one of a plurality of voltage regulated power sources and a common load.

It is yet another object of the invention to provide an improved coupling diode monitoring circuit in a paralleled voltage regulated power source arrangement in which a signal corresponding to the voltage across each coupling diode is compared with a signal corresponding to the forward conducting voltage across the rectifier devices of the associated power source.

It is yet another object of the invention to provide an improved coupling diode monitoring circuit in a paralleled voltage regulated power source arrangement in which a DC voltage corresponding to the forward drop across each coupling diode is compared with a DC voltage corresponding to the peak forward voltage drop across the rectifying diodes of the associated power source.

It is yet another object of the invention to provide an improved coupling diode monitoring circuit in a paralleled voltage regulated power source arrangement wherein an alarm is set responsive to the voltage across the coupling diode exceeding the peak forward voltage drop across the power source rectifier diodes.

SUMMARY OF THE INVENTION

Our invention is directed to a monitoring circuit in a power source arrangement serving a load. A first signal corresponding to the voltage across the device coupling each of a plurality of paralleled power sources to the common load is compared with a second signal corresponding to the conducting voltage across the rectifying devices of the associated power source. Responsive to the first signal derived from the coupling device exceeding the second signal derived from the rectifying devices, an alarm signal is generated.

According to one aspect of the invention, each power source is connected to the common load through a normally conducting coupling diode. A first DC voltage corresponding to the voltage across the coupling diode is generated and a second DC voltage corresponding to the forward voltage drop across the associated power source rectifying devices is also generated. The first and second DC voltages are compared; and an alarm device is set responsive to the first DC voltage exceeding the second DC voltage.

According to another aspect of the invention, each power source includes a voltage regulator adapted to stabilize the power source output voltage applied to the coupling diode. The coupling diode monitoring circuit includes first means for monitoring the voltage across the coupling diode connected between the power source and the common load, and second means for monitoring the peak conducting voltage across the power source rectifying devices. The first means output signal is compared with the second means output signal and an alarm device is set when the first means output is greater than the second means output.

In an embodiment illustrative of the invention, each regulated power source output is applied to the anode of a coupling diode and the coupling diode cathode is connected to the common load. The voltage across the coupling diode is applied to a first amplifier of suitable gain. The power source includes a pair of rectifier diodes and the voltages across the rectifier diodes are applied to a peak detector, said peak detector being responsive to the forward conducting voltages appearing across said rectifier diodes. Responsive to the output of the peak detector, a DC voltage corresponding to the maximum rectifier diode peak forward voltage is applied to a second amplifier of suitable gain. The output of the first amplifier proportional to the coupling diode voltage is compared with the output of the second amplifier, which is proportional to the peak forward voltage across the rectifier diodes. Responsive to the first amplifier output exceeding the second amplifier output, a signal is generated by the comparator. The comparator signal sets an alarm device. The large decrease in rectifier diode current resulting from an open or high forward characteristic coupling diode causes a relatively large reduction in the rectifier diode voltage drop. Consequently, a significant difference between the first and second amplifier outputs occurs whereby the diode monitoring circuit is sensitive to the condition of the coupling diode.

DETAILED DESCRIPTION

Figure 1:
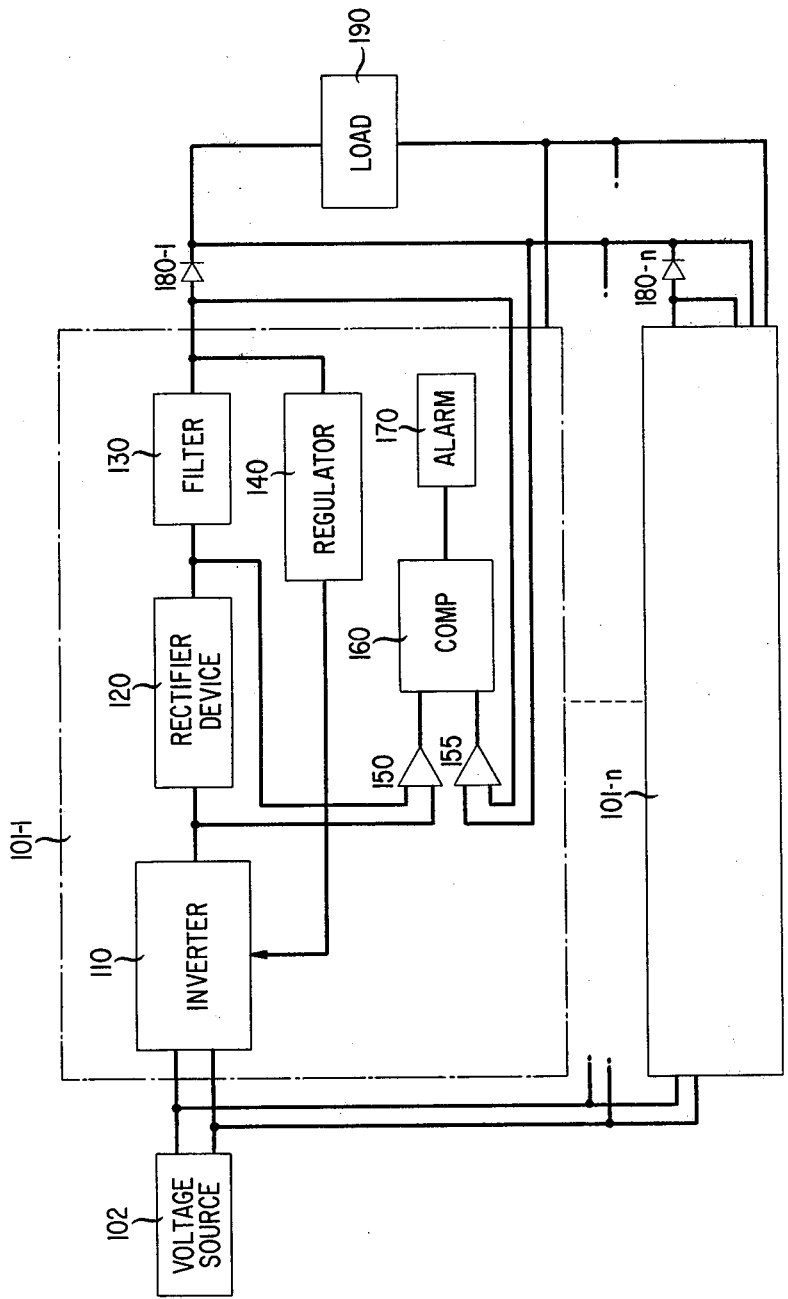
FIG. 1 depicts an embodiment illustrative of the invention wherein a plurality of power sources supply a common load through coupling diodes.

In FIG. 1, a plurality of power sources 101-1 through 101-n, are coupled to common load 190 via diodes 180-1 through 180-n, respectively. Each power source, e.g., source 101-1, includes inverter 110 which converts the DC voltage from source 102 to an AC voltage of appropriate value. The AC output of inverter 110 is supplied to rectifier device 120 which provides a pulsating DC voltage of appropriate value. The output voltage from rectifier device 120 is smoothed in filter 130 whereby a DC voltage of the desired value is obtained. A portion of the filitered output from filter 130 is fed back to inverter 110 via regulator 140, which regulator stabilizes the output voltage of power source 101-1 in accordance with well-known principles of power converters. The output of power source 101-1 is coupled to load 190 via coupling diode 180-1 and the output of power source 101-n is coupled to load 190 via coupling diode 180-n. In this way, each of a plurality of paralleled power sources provides a portion of the current required by load 190 at the desired DC voltage.

In the event that a coupling diode, e.g., 180-1, becomes open circuited or has a high forward voltage characteristic, the diode is rendered nonconductive and the associated power source is disconnected from load 190. The remaining power sources must then supply additional current to properly drive load 190. Under these circumstances, there is a distinct possibility of overloading the remaining power sources or having an inadequate degree of redundancy whereby the load is not properly served. The resulting supply inadequacy may cause damage to the equipment represented by load 190 and possible damage to the remaining power sources.

In the circuit of FIG. 1, the voltage across coupling diode 180-1 is applied to the inputs of amplifier 155 whereby the coupling diode voltage drop is continuously monitored. Since the output voltage of power source 101-1 is regulated, a defect in diode 180-1, which causes source 101-1 to be disconnected from load 190, does not significantly modify the voltage at the anode of coupling diode 180-1. The voltage at the cathode of diode 180-1 need not change if diode 180-1 becomes open circuited or has a high forward voltage characteristic because the remaining power sources drive load 190 at the specified voltage. Thus, merely monitoring the voltage across diode 180-1 may not detect the occurrence of an open coupling diode or a high forward characteristic diode.

In accordance with the invention, the conductive forward voltage drop across the power source rectifier devices is also monitored. In FIG. 1, the voltage across rectifier device 120 is applied to the inputs of amplifier 150. On the occurrence of an open circuit in coupling diode 180-1, the voltage output of amplifier 155 responsive to the voltage drop across diode 180-1 remains substantially the same. This is illustrated by curve B in FIG. 4 wherein the voltage across the coupling diode remains substantially invariant as a function of load current. But, power source 101-1 is effectively disconnected from load 190. Under these conditions, little or no current passes through rectifier device 120 whereby the forward voltage drop across rectifier device 120 is substantially reduced. This is illustrated in curve A of FIG. 4 wherein the voltage across the rectifier device is substantially larger at the normal load current $I_1$ than the voltage across said rectifier device at current $I_2$ when power source 101-1 is disconnected from the load. In the event the coupling diode is defective so that power source 101-1 is effectively disconnected from the load, the current in the rectifier devices is reduced, e.g., to $I_2$, and the forward voltage drop across the rectifier unit is substantially lower than the voltage drop across the coupling diode shown in curve B of FIG. 4.

The output of amplifier 150 is applied to one input of comparator 160 and the output of amplifier 155 is applied to the other input of comparator 160. Under normal conditions, the output of amplifier 150 corresponding to the forward voltage drop across rectifier device 120 is larger than the output from amplifier 155 which corresponds to the voltage drop across coupling diode 180-1. Comparator 160 remains quiescent. On the occurrence of a defect in coupling diode 180-1 which disconnects power source 101-1 from load 190, the voltage at the output of amplifier 155 becomes greater than the voltage at the output of amplifier 150. Responsive to the change in polarity at its inputs, comparator 160 generates an alarm signal to set alarm 170. In this manner, the defect in coupling diode 180-1 causing power source 101-1 to be disconnected from load 190 is detected.

Figure 2:
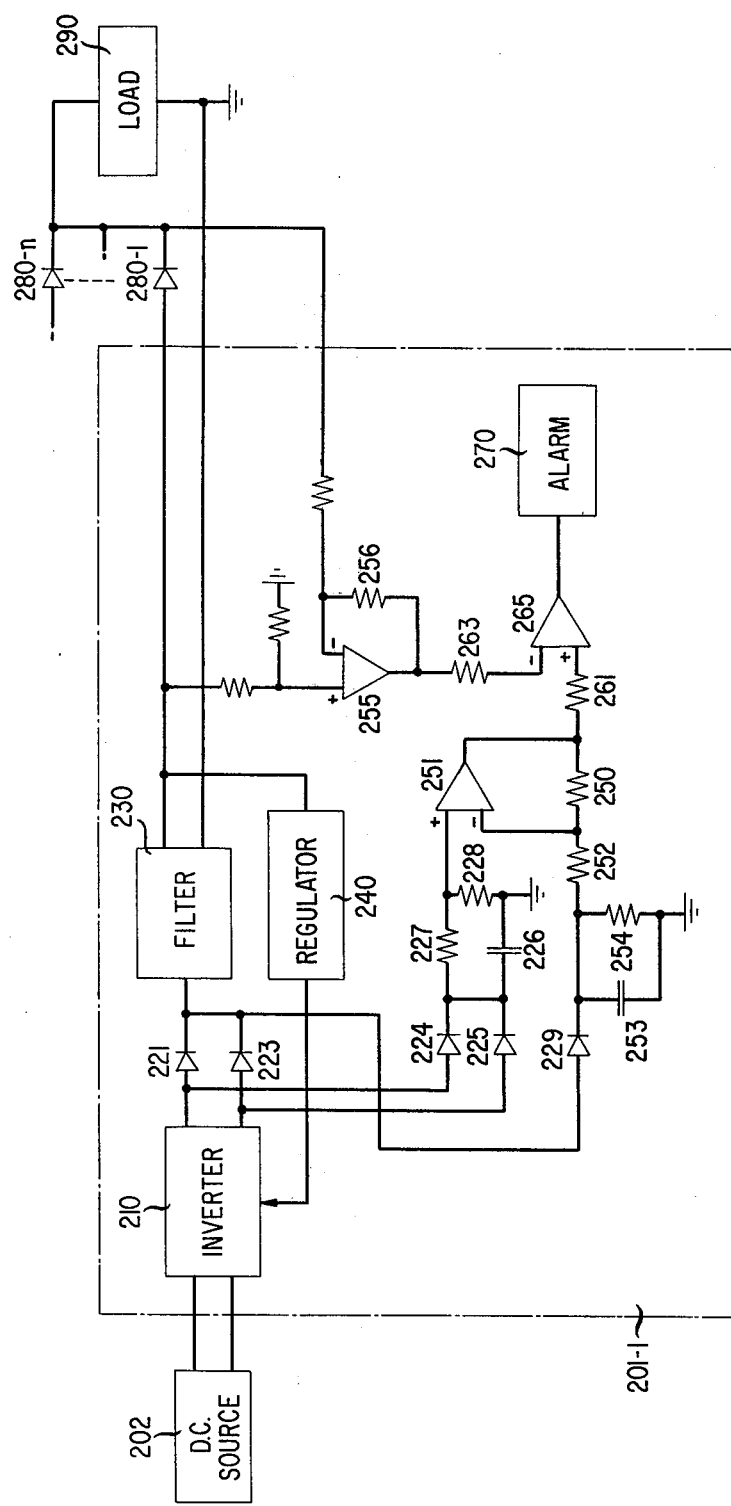
FIG. 2 shows a block diagram of a DC to DC converter wherein an embodiment illustrative of the invention is utilized.

FIG. 2 shows DC to DC converter 201-1 which is coupled to load 290 via coupling diode 280-1 and is driven from DC source 202. Additional coupling diodes, such as coupling diode 280-n, also supply load 290 from power sources not shown. Inverter 210 of power source 201-1 is operative to convert the DC voltage from source 202 to an AC voltage at a specified level. The AC output of inverter 210 is applied to rectifier diodes 221 and 223 from which a pulsating DC voltage is obtained. Filter 230 smooths the pulsating voltage so that a positive voltage at a specified level is applied to load 290 via coupling diode 280-1. Regulator 240 is responsive to the output voltage of power source 201-1 and operates in a feedback loop to control the voltage output of inverter 210. In this way, a specified regulated voltage is obtained at the output of power source 201-1.

The voltage across coupling diode 280-1 is applied to operational amplifier 255. The positive input of operational amplifier 255 is connected to the anode of coupling diode 280-1 while the negative input of amplifier 255 is connected to the cathode of diode 280-1. As shown, power source 201-1 provides a positive voltage to load 290 whereby the output voltage of amplifier 255 is a positive voltage corresponding to the drop across coupling diode 280-1.

The positive input of operational amplifier 251 is connected to the anodes of rectifier diodes 221 and 223 via the network including detector diodes 224 and 225 and the filter network including capacitor 226 and voltage divider resistors 227 and 228. Diode 224 is poled so that only positive excursions at the anode of rectifier diode 221 pass therethrough. Similarly, diode 225 is poled so that positive excursions at its anode are applied to capacitor 226. Capacitor 226 operates as a filter element whereby the greatest peak voltage on the anodes of diodes 221 and 223 is detected and stored. Resistors 227 and 228 provide an appropriate attenuation network between capacitor 226 and positive input of operational amplifier 251.

The cathodes of diodes 221 and 223 are connected in common to the negative input of operational amplifier 251 via diode 229 and the network including capacitor 253 and resistors 252 and 254. Diode 229 is poled so that the voltage at the cathodes of rectifier diodes 221 and 223 is applied to the negative input of amplifier 251 only when the cathodes are at a positive potential. Diodes 224, 225, and 229 are preferably selected to have identical forward drops which track with temperature. Thus, the DC voltage between the positive and negative inputs of operational amplifier 251 corresponds to the largest peak forward voltage drop across rectifier diodes 221 and 223.

The gains of amplifiers 251 and 255 are controlled by feedback impedances 250 and 256, respectively, whereby an appropriate comparison can be made between the voltage drop across coupling diode 280-1 and the peak forward voltage drop across rectifier diodes 221 and 223. Comparator operational amplifier 265 has its positive input connected to the output of amplifier 251 via resistor 261 and has its negative input connected to the output of amplifier 255 via impedance 263. Under normal conditions, rectifier diodes 221 and 223 conduct heavily whereby the output voltage of amplifier 251 is greater than the output voltage of amplifier 255. Responsive to the normal condition, comparator amplifier 265 provides a relatively positive signal to alarm 270. This relatively positive signal is ineffective to set alarm 270.

In the event coupling diode 280-1 becomes open circuited or has a high forward characteristic, the voltage thereacross remains substantially the same. As aforementioned, this is due to the regulated operation of power source 201-1 and the fact that the remaining power sources are operative to maintain the voltage across load 290 despite the disconnection of power source 201-1. With power source 201-1 disconnected from load 290, however, little or no current flows through rectifier diodes 221 and 223. Thus, the voltage across the inputs of amplifier 251 corresponding to the peak forward drop across diodes 221 and 223 is greatly decreased and the output of amplifier 255 becomes greater than the output of amplifier 251. Responsive to change in output voltages from amplifiers 251 and 255, comparator 265 provides a relatively negative output voltage to set alarm 270. In this manner, the open circuit or high forward characteristic condition of diode 280-1 is detected.

Figure 3:
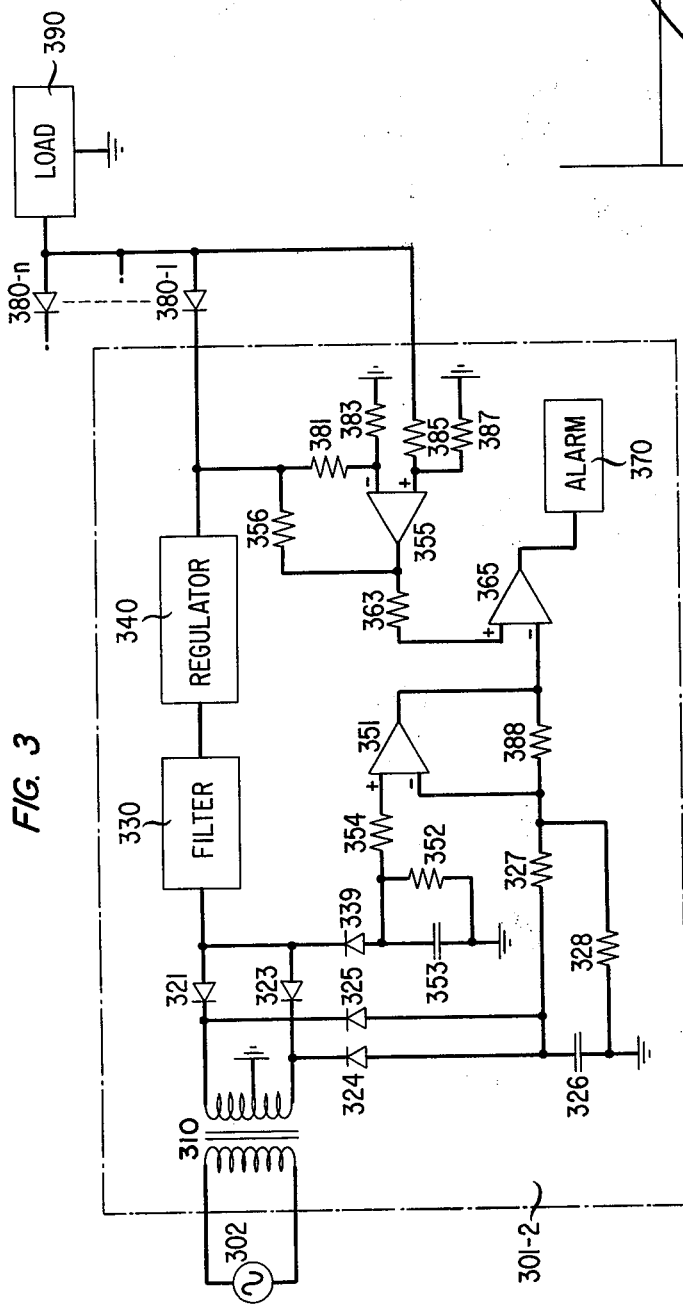
FIG. 3 shows a diagram of an AC to DC rectifier arrangement in which an embodiment of the invention is utilized.

FIG. 3 shows an AC rectifier unit providing a negative DC output voltage in which the subject invention is employed. AC source 302 drives transformer 310 from which an AC voltage of predetermined value is obtained. Each of rectifier diodes 321 and 323 is poled to conduct during the negative half-cycle of the transformer output voltage whereby a negative pulsating DC voltage is presented to filter 330. Filter 330 smooths the pulsating DC voltage and applies the resulting negative DC voltage to regulator 340. As is well known in the art, regulator 340 provides a constant voltage at the output thereof and this constant voltage is conducted to load 390 via coupling diode 380-1. Diode 380-n is similarly connected to a rectifier unit, not shown. In this manner, a plurality of paralleled rectifier units serve common load 390.

The voltage across coupling diode 380-1 is applied to amplifier 355 and the largest peak voltage across rectifier diodes 321 and 323 is applied to amplifier 351. Comparator 365 detects the polarity of the difference between the outputs of amplifiers 351 and 355. Responsive to a selected difference polarity, comparator 365 provides an alarm signal operative to set alarm 370. The cathode of diode 380-1 is connected to the negative input of amplifier 355 through the voltage divider including resistors 381 and 383 and the anode of diode 380-1 is connected to the positive input of said amplifier through the voltage divider including resistors 385 and 387. Since the anode of conducting diode 380-1 is more positive than the cathode thereof, the output of amplifier 355 is positive. The gain of amplifier 355 is determined by feedback impedance 356. The output of amplifier 355 represents the voltage drop across diode 380-1 shown in curve B of FIG. 4.

The cathode of rectifier diode 321 is coupled by the peak detector network including diode 325, capacitor 326, and voltage divider resistors 327 and 328 to the negative input of amplifier 351, and the cathode of diode 323 is coupled to said peak detector network via diode 324. Diodes 324 and 325 are poled to detect the peak value of the negative voltages at the cathodes of diodes 321 and 323. Capacitor 326 stores the peak negative cathode voltage and supplies said detected peak cathode voltage to the negative input of amplifier 351. The commonly connected anodes of diodes 321 and 323 are connected to the positive input of amplifier 351 through diode 339 and the peak detector filter network including capacitor 353 and voltage divider resistors 352 and 354. Impedance 388 determines the gain of amplifier 351. The positive DC voltage from amplifier 351 representing the peak conductive rectifier diode voltage is applied to the negative input of comparator 365.

Figure 4:
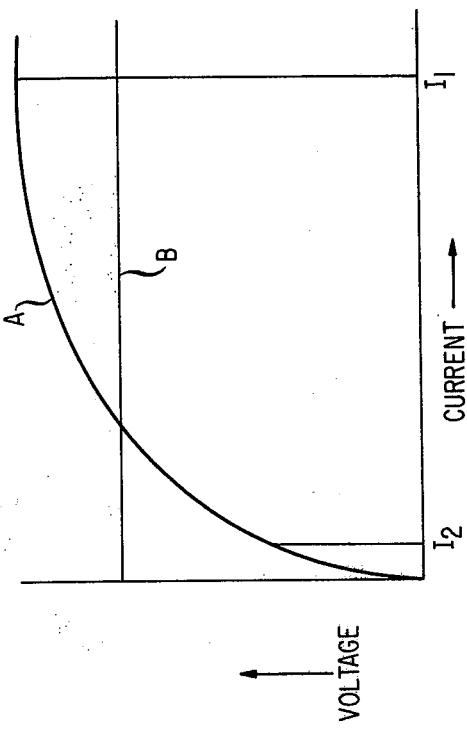
FIG. 4 shows curves of diode characteristics useful in describing the foregoing illustrative embodiments of the invention.

During normal operation, rectifier diodes 321 and 323 conduct a relatively high current, such as current $I_1$ in FIG. 4, and the voltage across these diodes is greater than the voltage across coupling diode 380-1. In the event that diode 380-1 becomes open circuited or exhibits a high forward voltage characteristic, it becomes nonconductive, but the DC voltage across the coupling diode remains substantially the same. Since the rectifier unit of FIG. 3 serving coupling diode 380-1 is disconnected from the load under these conditions, the current through rectifier diodes 321 and 323 is substantially reduced. The voltage across the rectifier diodes also decreases whereby the output of amplifier 351 is greatly reduced. The output of amplifier 355, however, remains substantially the same and the polarity of the voltage difference across the inputs to comparator 365 reverses. The reversed polarity output signal from comparator 365 is applied to the input alarm 370, which alarm is then set.

Although the invention has been described with reference to specific embodiments thereof, it is to be understood that these embodiments are illustrative only and modifications and variations apparent to those skilled in the art may be made without departing from the spirit and scope of the invention.

What is claimed is:

1. A monitoring circuit in a power source arrangement having a plurality of supplies coupled to a common load, each supply comprising at least one rectifier device and a device for coupling said supply to the common load, said monitoring circuit comprising first means for generating a signal corresponding to the voltage across said coupling device, second means for generating a signal corresponding to the conducting voltage across said rectifier device, and means responsive to said first means signal exceeding said second means signal for producing an alarm signal.

2. A monitoring circuit in a power source arrangement according to claim 1 wherein said coupling device comprises a coupling diode poled to conduct current between its associated supply and said common load, said first means comprises means for generating a first DC voltage corresponding to the voltage drop across said coupling diode, said second means comprises means for generating a second DC voltage corresponding to the conductive voltage across said rectifier device, and said alarm signal producing means comprises means for comparing said first DC voltage with said second DC voltage, said comparing means being responsive to said first DC voltage exceeding said second DC voltage for producing said alarm signal.

3. A rectifier monitoring circuit in a power source arrangement according to claim 2 wherein each supply includes a voltage regulator adapted to stabilize the supply output applied to said coupling diode, said first DC voltage generating means comprises means for generating a DC voltage proportional to the voltage across said coupling diode, and said second DC voltage generating means comprises means for generating a DC voltage proportional to the conductive voltage across said supply rectifier device.

4. A monitoring circuit in a power source arrangement according to claim 3 wherein said rectifier device comprises a plurality of rectifier diodes and said conductive voltage DC generating means comprises means for monitoring the peak conductive voltage drop across said rectifier diodes.

5. A monitoring circuit in a power source arrangement according to claim 4 wherein said first DC voltage generating means comprises first amplifying means of predetermined gain, said peak conductive voltage monitoring means comprises means for detecting the peak forward voltage across said rectifier diodes and second amplifying means of predetermined gain responsive to the output of said detecting means, and said comparing means comprises third amplifying means responsive to the output of said first amplifying means exceeding the output of said second amplifying means for producing said alarm signal.

6. In combination, a plurality of voltage regulated supplies, each supply including a rectifier unit and each supply being coupled to a common load via a coupling diode, and a monitoring circuit for detecting a faulty coupling diode comprising first means for generating a signal corresponding to the voltage across said coupling diode, second means for generating a signal corresponding to the conductive voltage across said rectifier unit, and third means responsive to said first generating means signal exceeding said second generating means signal for setting an alarm device indicative of said coupling diode being nonconductive.

7. The combination according to claim 6 wherein said first means comprises means responsive to the voltage across said coupling diode for producing a first DC voltage, said second means comprises means responsive to the peak conducting voltage across said rectifier unit for producing a second DC voltage, and said third means comprises means for comparing said first DC voltage with said second DC voltage, said third means being responsive to said first DC voltage exceeding said second DC voltage for setting said alarm device.

8. The combination according to claim 7 wherein said comparing means comprises a comparator amplifier having first and second inputs and an output, said first DC voltage producing means comprises a first amplifier of predetermined gain having a pair of inputs and an output, said first amplifier inputs being connected across said coupling diode, said first amplifier output being connected to said comparator amplifier first input, said second DC voltage producing means comprises means for detecting the peak conducting voltage across said rectifier unit and a second amplifier having a pair of inputs connected to said detecting means and an output connected to said comparator amplifier second input, said comparator amplifier output being connected to said alarm device.

9. In combination, a plurality of power supplies connected between an energy source and a common load, each supply comprising a rectifier device and a unidirectional coupling device connecting said power supply to said common load; and a monitoring circuit comprising first means for generating a first signal corresponding to the voltage across said unidirectional coupling device, second means for generating a second signal corresponding to the peak conducting voltage across said rectifier device, and means for comparing said first signal with said second signal, said comparing means being responsive to said first signal exceeding said second signal to produce an alarm signal.

10. The combination according to claim 9 wherein said unidirectional coupling device comprises a diode poled to conduct current between said supply and said common load, and said rectifier device comprises a plurality of rectifier diodes.

11. The combination according to claim 9 wherein each power supply comprises a DC to DC converter having a voltage regulator, and said energy source comprises a common DC voltage source.

12. A combination according to claim 9 wherein each power supply comprises an AC to DC converter having a voltage regulator, and said energy source comprises a common AC voltage source.

13. A power supply system comprising a plurality of voltage regulated power converters each having a plurality of rectifier devices and a coupling diode for connecting said power converter to a common load, and a monitoring circuit comprising means connected across said coupling diode for producing a first signal proportional to the voltage across said coupling diode, means connected to said plurality of rectifier devices for producing a second signal proportional to the peak forward voltage across said rectifier devices, and comparing means responsive to said first signal exceeding said second signal for generating an alarm signal, said alarm signal indicating said coupling device is nonconductive.

14. A power supply system according to claim 13 wherein said first signal producing means comprises a first operational amplifier having a pair of inputs and an output, and means for connecting said coupling diode across said first operational amplifier inputs; said second signal producing means comprises means for detecting the peak forward voltage across said rectifier devices, and a second operational amplifier having a pair of inputs connected to said detecting means and an output; and said comparing means comprising a third operational amplifier having a first input connected to said first operational amplifier output, a second input connected to said second operational amplifier output, and an output, said third operational amplifier being responsive to a predetermined polarity of the difference between said first operational amplifier output and said second operational amplifier output for producing an alarm signal at said third operational amplifier output.

* * * * *